(12) United States Patent
Singh

(10) Patent No.: US 11,093,267 B2
(45) Date of Patent: Aug. 17, 2021

(54) PROXY AUTO CONFIG (PAC) FILE PARSER SYSTEMS AND METHODS

(71) Applicant: Zscaler, Inc., San Jose, CA (US)

(72) Inventor: Amandeep Singh, Surrey (CA)

(73) Assignee: Zscaler, Inc., San Jose, CA (US)

( * ) Notice: Subject to any disclaimer, the term of this patent is extended or adjusted under 35 U.S.C. 154(b) by 20 days.

(21) Appl. No.: 16/691,055

(22) Filed: Nov. 21, 2019

(65) Prior Publication Data

US 2021/0157619 A1 May 27, 2021

(51) Int. Cl.
*G06F 9/455* (2018.01)
*G06F 16/955* (2019.01)
*H04L 29/08* (2006.01)
*G06F 9/445* (2018.01)

(52) U.S. Cl.
CPC ........ *G06F 9/4552* (2013.01); *G06F 9/44505* (2013.01); *G06F 16/955* (2019.01); *H04L 67/28* (2013.01)

(58) Field of Classification Search
CPC ... H04L 67/28; G06F 16/955; G06F 9/44505; G06F 9/4552
See application file for complete search history.

(56) References Cited

U.S. PATENT DOCUMENTS

| | | | | |
|---|---|---|---|---|
| 8,676,922 | B1* | 3/2014 | Milner | G06F 16/957 709/217 |
| 2013/0340031 | A1* | 12/2013 | Amit | H04W 12/37 726/1 |
| 2020/0186501 | A1* | 6/2020 | Neystadt | H04L 63/0281 |

OTHER PUBLICATIONS

"Proxy Auto-Config Files", Apr. 7, 2011, Cisco, Retrieved from <https://www.cisco.com/c/en/us/td/docs/security/web_security/connector/connector2972/PACAP.html> (Year: 2011).*

* cited by examiner

*Primary Examiner* — Marina Lee
(74) *Attorney, Agent, or Firm* — Clements Bernard Walker; Lawrence A. Baratta, Jr.; Jacob P. Beers

(57) ABSTRACT

Proxy Auto Config (PAC) file parser systems and methods enable file parsing on user devices without Just-in-Time (JIT) compilation in JavaScript, with a memory efficient implementation and with efficient performance. The PAC parser supports multi proxy connections, traffic rules (e.g., bypass/send to proxy, etc.) based on various PAC functions, etc. The PAC parser can be utilized on a user device with an enterprise application and with cloud-based services.

17 Claims, 4 Drawing Sheets

PROXY AUTO CONFIG (PAC) FILE PARSER SYSTEMS AND METHODS

FIELD OF THE DISCLOSURE

The present disclosure relates generally to networking and computing. More particularly, the present disclosure relates to Proxy Auto Config (PAC) file parser systems and methods.

BACKGROUND OF THE DISCLOSURE

A Proxy Auto-Config (PAC) file defines how web browsers and other user agents, executed on a user device, can automatically choose the appropriate proxy server (access method) for fetching a given Uniform Resource Locator (URL). PAC files are JavaScript (JS)-based files that return proxies based on expressions within the file. To parse PAC files on user devices, certain PAC parsers have been built over certain JavaScript engines, e.g., SpiderMonkey, V8, etc. However, some user devices over certain platforms do not support certain aspects of JS. For example, iOS (from Apple Corporation) does not support a Just-In-Time (JIT) compiler that is a component of the Java Runtime Environment (JRE) that improves the performance of Java applications at run time. Without JIT support, various functions required for PAC parsing are not available on platforms such as iOS. Of note, iOS is widely deployed for mobile devices including smartphones and tablets. There is a need for PAC parsing support on such platforms in the absence of JIT support.

BRIEF SUMMARY OF THE DISCLOSURE

The present disclosure relates to Proxy Auto Config (PAC) file parser systems and methods. The present disclosure enables PAC file parsing on user devices without JIT, with a memory-efficient implementation, and with efficient performance. The PAC parser supports multi-proxy connections, traffic rules (e.g., bypass/send to proxy, etc.) based on various PAC functions, etc. In an embodiment, the PAC parser is implemented in native iOS languages, such as Objective-C, using a native JS engine.

In an embodiment, a non-transitory computer-readable storage medium having computer-readable code stored thereon for programming a user device to perform steps of obtaining a Proxy Auto Config (PAC) file from a cloud service and initializing a PAC parser on the user device therewith; for a request to access a Uniform Resource Locator (URL), extracting a hostname and providing the hostname to the PAC parser; and based on an Internet Protocol (IP) address associated with the hostname, one of i) sending the request direct to the Internet separate from the cloud, ii) sending the request to a first proxy associated with the cloud service, and iii) sending the request to a second proxy associated with the cloud service. The user device can include an operating system that does not support a Just-In-Time (JIT) compiler. The PAC parser performs a plurality of PAC functions that require the JIT compiler via a call to code implemented in a native language. The sending steps can be performed based on a prefix of the IP address. The sending steps to the first proxy and the second proxy can be performed based on the hostname. The cloud service can be a cloud-based security system and the first proxy and the second proxy are based on rules of the cloud-based security system. The first proxy can be for private traffic and the second proxy can be for public traffic.

In another embodiment, a user device includes a network interface communicatively coupled to a network; a processor communicatively coupled to the network interface; and memory storing computer-executable instructions that, when executed, cause the processor to obtain a Proxy Auto Config (PAC) file from a cloud service and initializing a PAC parser on the user device therewith; for a request to access a Uniform Resource Locator (URL), extract a hostname and providing the hostname to the PAC parser; and based on an Internet Protocol (IP) address associated with the hostname, one of i) send the request direct to the Internet separate from the cloud, ii) send the request to a first proxy associated with the cloud service, and iii) send the request to a second proxy associated with the cloud service. The user device can include an operating system that does not support Just-In-Time (JIT) complier. The PAC parser performs a plurality of PAC functions that require the JIT compiler via a call to code implemented in a native language. The sending steps can be performed based on a prefix of the IP address. The sending steps to the first proxy and the second proxy can be performed based on the hostname. The cloud service can be a cloud-based security system and the first proxy and the second proxy are based on rules of the cloud-based security system. The first proxy can be for private traffic and the second proxy can be for public traffic.

In a further embodiment, a method includes obtaining a Proxy Auto Config (PAC) file from a cloud service and initializing a PAC parser on the user device therewith; for a request to access a Uniform Resource Locator (URL), extracting a hostname and providing the hostname to the PAC parser; and based on an Internet Protocol (IP) address associated with the hostname, one of i) sending the request direct to the Internet separate from the cloud, ii) sending the request to a first proxy associated with the cloud service, and iii) sending the request to a second proxy associated with the cloud service. The user device can include an operating system that does not support a Just-In-Time (JIT) compiler. The PAC parser performs a plurality of PAC functions that require the JIT compiler via a call to code implemented in a native language. The sending steps can be performed based on a prefix of the IP address. The sending steps to the first proxy and the second proxy can be performed based on the hostname. The cloud service can be a cloud-based security system and the first proxy and the second proxy are based on rules of the cloud-based security system.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

DETAILED DESCRIPTION OF THE DISCLOSURE

Again, the present disclosure relates to Proxy Auto Config (PAC) file parser systems and methods. The present disclosure enables PAC file parsing on user devices without JIT, with a memory-efficient implementation, and with efficient performance. The PAC parser supports multi-proxy connections, traffic rules (e.g., bypass/send to proxy, etc.) based on various PAC functions, etc. In an embodiment, the PAC parser is implemented in native iOS languages, such as Objective-C, using a native JS engine.

Example Cloud System Architecture

Figure 1:
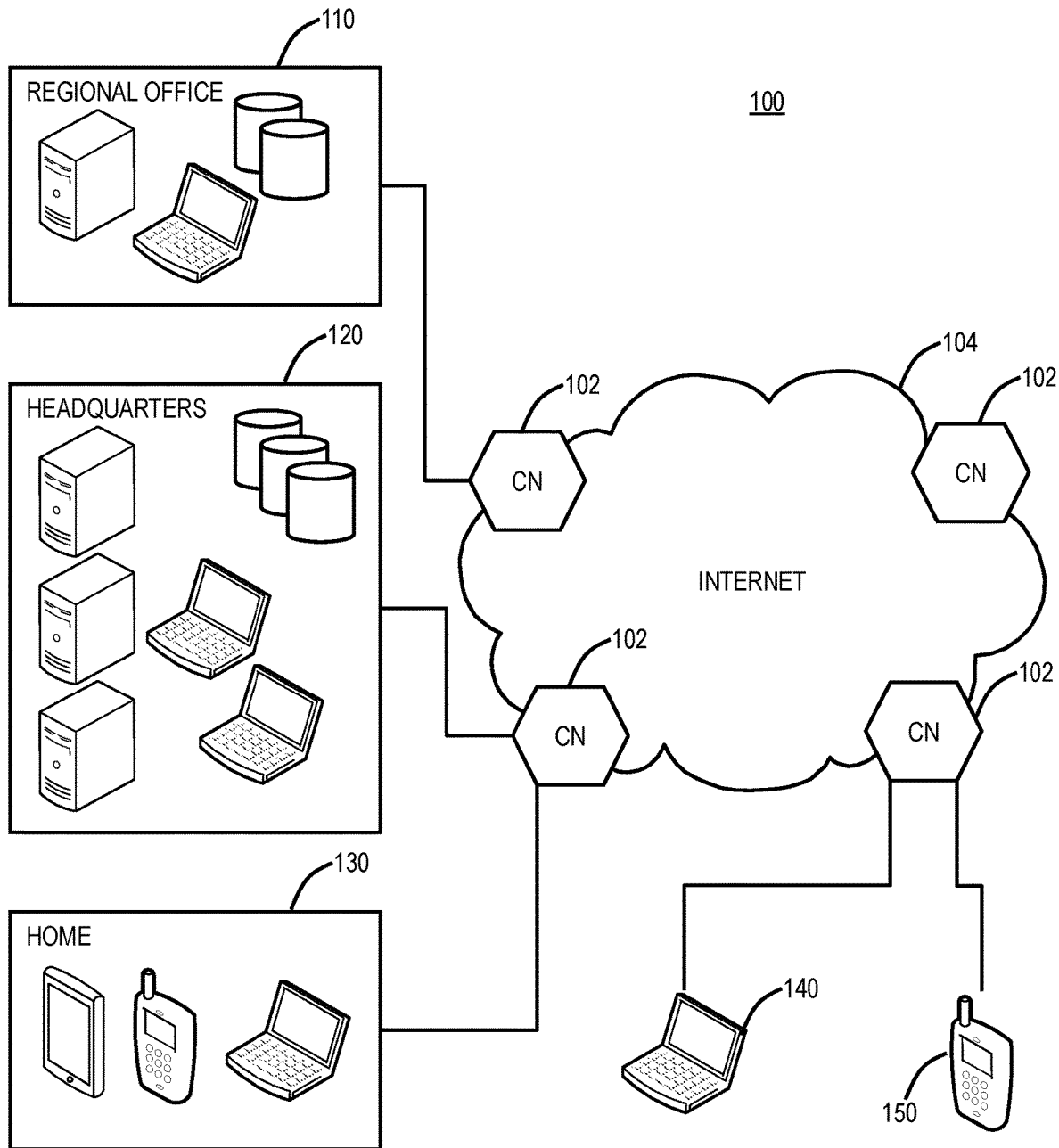
FIG. 1 is a network diagram of a cloud-based system for implementing various cloud-based service functions.
Figure 2:
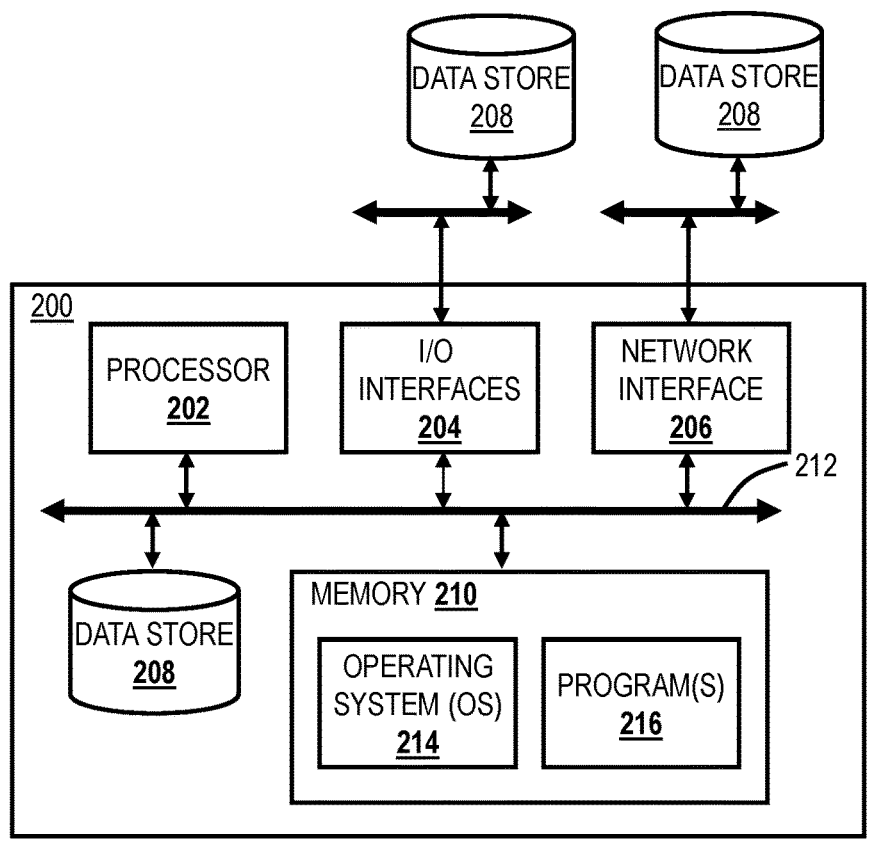

FIG. 1 is a network diagram of a cloud-based system 100 for implementing various cloud-based service functions. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one of the cloud nodes 102. These locations 110, 120, 130, and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS), where X is security, access, etc.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee and applicant of the present application). The IA service can include firewall, threat prevention, Deep Packet Inspection (DPI), Data Leakage Prevention (DLP), and the like. The PA can include access control, microservice segmentation, etc. For example, the IA service can provide a user with Internet Access, and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an embodiment, the cloud-based system 100 may be viewed as Security-as-a-Service through the cloud, such as the IA. For example, the cloud-based system 100 can be used to block or allow access to web sites, and such access control can be based in part on the web crawler systems and methods described herein to identify malicious sites.

Figure 3:
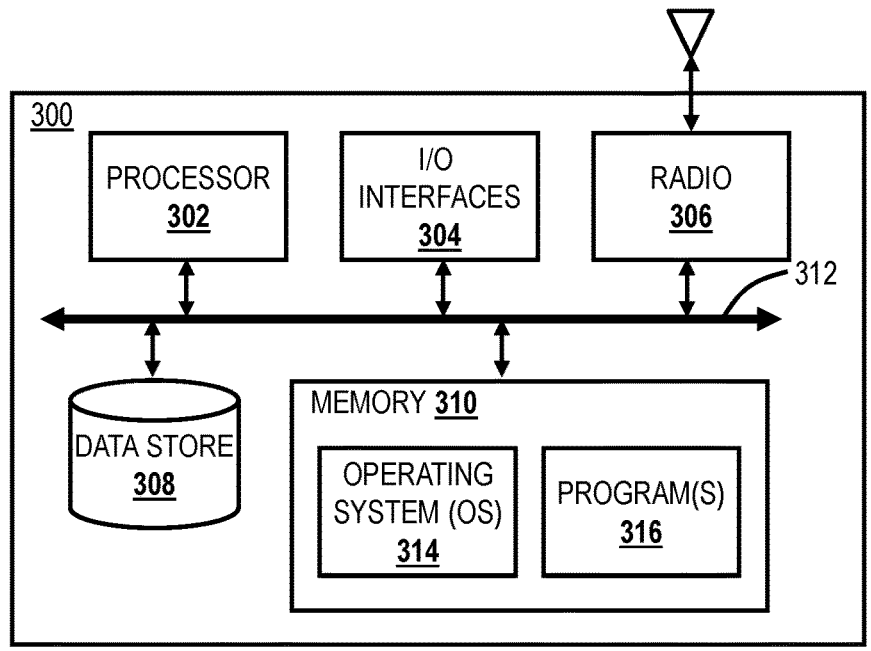

In an embodiment, the cloud-based system 100 can be configured to provide mobile device security and policy systems and methods. The mobile device 150 may be a mobile device 200 (as illustrated in FIG. 3) and may include common devices such as laptops, smartphones, tablets, netbooks, personal digital assistants, MP3 players, cell phones, e-book readers, and the like. The cloud-based system 100 is configured to provide security and policy enforcement for devices, including the mobile devices 150 in the cloud.

Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users, which is dynamically available at the cloud nodes 102, etc.

Example Server Architecture

FIG. 2 is a block diagram of a server 200, which may be used in the cloud-based system 100, in other systems, or standalone. For example, the cloud nodes 102 may be formed as one or more of the servers 200. The server 200 may be a digital computer that, in terms of hardware architecture, generally includes a processor 202, Input/Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, Input/Output (I/O) interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable Operating System (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Enterprise Application

Figure 4:
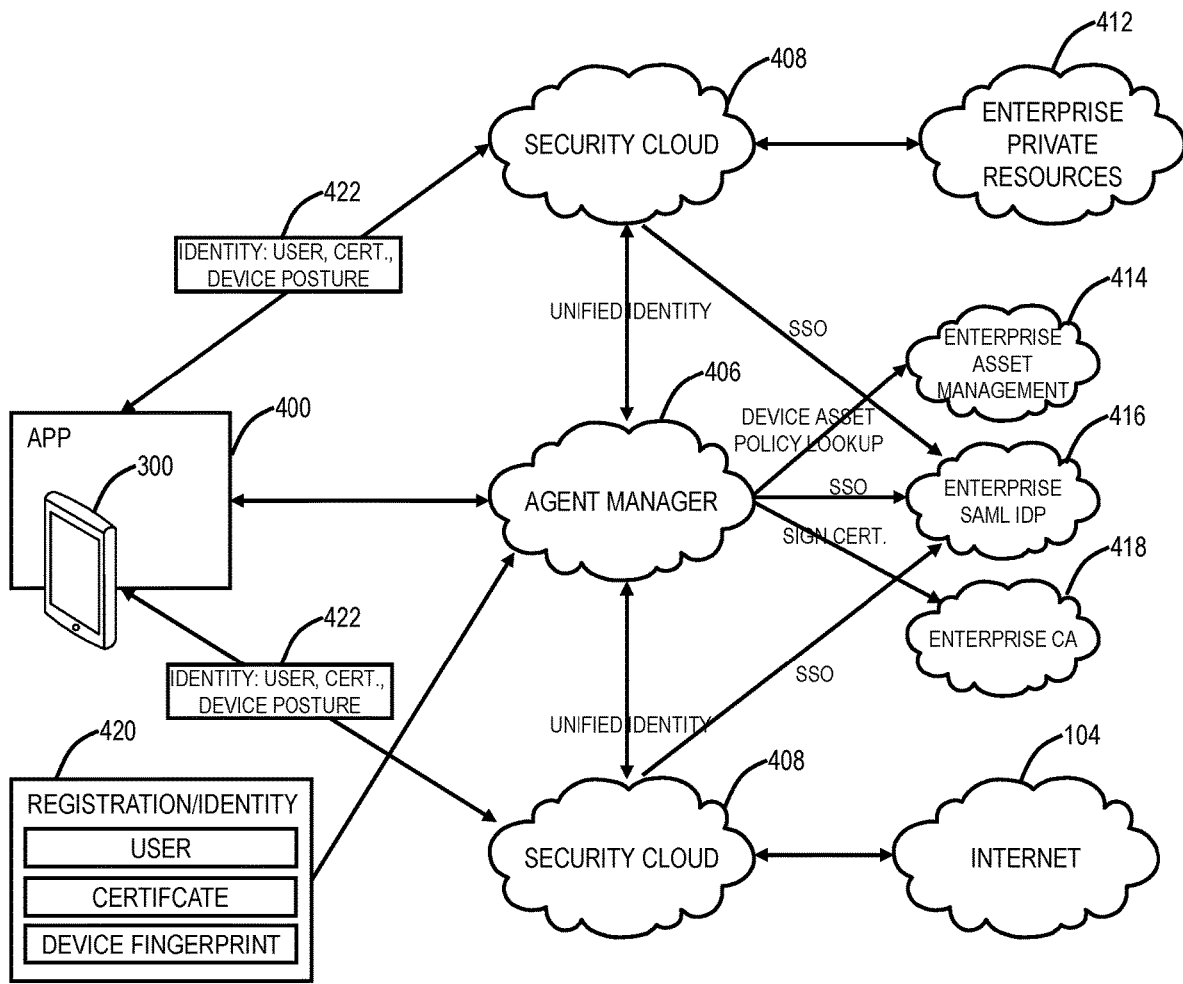
FIG. 4 is a network diagram of the functionality of an example enterprise application and associated connectivity.

FIG. 4 is a network diagram of the functionality of an example enterprise application 400 and associated connectivity. The enterprise application 400 is executed on a user device 300. The enterprise application 400 can dynamically learn all available services, adapts to changing network environments, and provides a seamless and secure network resource access to Internet and darknet hosted applications. This is achieved through dynamic evaluation of network conditions, enrollment to individual services, learning individual service protocols, creating a link-local network on the device 300, and establishing multiple secure tunnels to cloud services over this local network.

The enterprise application 400 is communicatively coupled to an agent manager cloud 406, and a security cloud 408. Note, the security cloud 408 can be implemented in the cloud-based system 100, etc. The enterprise application 400 enables communication to enterprise private resources 412 via the security cloud 408 and to the Internet 104 via the security cloud 408. The agent manager cloud 406 can communicate with enterprise asset management 414, an enterprise Security Assertion Markup Language (SAML) Identity Provider (IDP) 416, and an enterprise Certificate Authority (CA) 418. The device 300 and the enterprise application 400 can perform a registration/identity 320 process through the agent manager cloud 306 where the user identity, the user's certificates, and a device fingerprint can uniquely identify the device 300. Once registered, the enterprise application 400 has an identity 322, which can include the user, certificates, device posture, etc. and which is shared with the security cloud 308.

The enterprise application 400 operates on a client-server model where an Information Technology (IT) admin enables appropriate services for end-users at a Cloud Administration Server (CAS), which can be part of an agent manager cloud 406, namely the enterprise asset management 414. Every client can make a unicast request to the agent manager cloud 406 (e.g., CAS) to discover all enabled services. On acknowledging the response, the client issues a request to authenticate to each service's cloud Identity Providers, the enterprise SAML IDP 416. Authentication can be multifactor depending upon the nature of the service. On successful authentication, server contacts Mobile Device Management (MDM) or Inventory management provider to define access control rights for the device 300. Post authorization, the device 300 is successfully enrolled into the agent manager cloud 406, which tracks and monitors all behavior of the device 300.

Post-enrollment, the device 300 creates a link-local network with a specific Internet Protocol (IP) configuration, opens a virtual network interface to read and write packets, and opens multiple listening sockets at custom ports to create secure tunnels to available services through the security cloud 408. On network changes, the device 300 dynamically evaluates reachability to pre-configured domains, and depending upon the result, it appropriately transitions all network tunnels, thus providing a seamless experience to the end-user. Further, the device 300 also intelligently learns the conditions which are appropriate for setting up network tunnels to cloud services depending upon several network heuristics such as reachability to a particular cloud service.

Enterprise Application—Functionality

The enterprise application 400 enables a user to connect to multiple cloud services through the dynamic discovery of available services followed by authentication and access as exposed in the corresponding service protocol. The enterprise application 400 addressed the unmanageable growth of mobility and cloud-based services, which have led to a proliferation of individual applications for access to individual services. The enterprise application 400 can be implemented through a mobile application ("app"), which overcomes the hassle of deploying and managing several applications across a gamut of mobile devices, operating systems, and mobile networks to gain secure access to the cloud-based internet or intranet resources. The mobile application can uniquely perform a Dynamic evaluation of Network and Service Discovery, Unified Enrollment to all services, Application dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end-user, followed by authentication and access to individual services. Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user to all of those services. It will then set up secure tunnels for each application depending upon whether the application is internet bound or if it is internal to the corporate network (intranet).

The mobile app will also discover all applications provided within the enterprise cloud along with a Global Virtual Private Network (GVPN) service and show the available services to end-user. Endpoint Applications today provide one service for a specific network function (such as Virtual Private Network (VPN) to a corporate network, web security, antivirus to access the Internet). The mobile app can be used to enable all these services with single enrollment. The mobile app will provide services to darknet applications along with securing the Internet traffic. The mobile app can set up a local network on the mobile device.

Generally, the enterprise application 400 can support two broad functional categories—1) dynamic service discovery and access controls and 2) service availability. The dynamic service discovery and access controls include service configuration by the administrator, service discovery by the device 300, service acknowledgment and authentication, service authorization and enrollment, and the like. For service configuration by the administrator, the IT admin can provide cloud service details at a centralized knowledge server, such as part of the agent manager cloud 406, the enterprise asset management 414, etc. The cloud service details include the service type (e.g., Internet/intranet), network protocol, identity provider, server address, port, and access controls, etc.

For service discovery by the device 300, the device 300 can issue a network request to a known Cloud Administrative Server (CAS) in the agent manager cloud 406 to discover all enabled services for a user. If a specific cloud server is not known a priori, the device 404 can broadcast the request to multiple clouds, e.g., through the agent manager cloud 406 communicating to the enterprise asset management 414, the enterprise SAML IDP 416, and the enterprise CA 418.

For the service acknowledgment and authentication, the device 300 acknowledges the response of service discovery and initiates the authentication flow. The device 300 learns the authentication protocol through the service discovery configuration and performs authentication of a configured nature at the enterprise SAML IDP 416. For the service authorization and enrollment, post successful authentication, the CAS, authorizes the device 300, and fetches the access control information by contacting an MDM/Inventory Solutions Provider. Depending upon the user context and the nature of access, the CAS enrolls the device 300 into several cloud services and informs the cloud services that the user has been enrolled for access.

The service availability includes link-local network setup, a traffic interceptor, and dynamic traffic forwarding tunnels to authorized services. The link-local network setup, post-enrollment, has the device 300 create a local network on the device 300 itself to manage various networking functionalities. For the traffic interceptor, the device 300 intercepts and evaluates all Internet traffic. Allowed traffic is tunneled to the cloud services such as in the security cloud 408, whereas the rest of the traffic is denied as per enterprise policies. For the dynamic traffic forwarding tunnels to authorized services, depending upon the evaluation, the device 300 splits the traffic into the different tunnel to individual cloud services such as in the security cloud 408.

The enterprise application 400 is a single application that provides secure connectivity to the Internet 104 and darknet hosted applications, such as the private enterprise resources 412. The enterprise application 400 communicates securely to the agent manager 406, which is controlled by an IT admin. The enterprise application 400 learns available services and authenticates with each service. Post proper enrollment, the enterprise application 400 securely connects to cloud services by means of network tunnels.

Again, the enterprise application 400 is an example application, such as ZApp from Zscaler, Inc. Other types of enterprise applications are also contemplated herein. In general, the enterprise application 400 is executed on the user device 300, typically in the background. The enterprise application 400 enables some cloud-based functionality with the user device 300 and the cloud-based system 100. Further, issues with the enterprise application 400 are critical to resolve to ensure connectivity and access to the cloud-based system 100.

PAC Parsing Process

A PAC file is a JavaScript function that determines whether web browser requests (HTTP, HTTPS, and FTP) go directly to the destination or are forwarded to a web proxy server, such as one of the cloud nodes 102. In an embodiment, the enterprise application 400 includes the PAC parsing function. For example, the enterprise application 400 can parse PAC files to determine whether to proxy connections, where to proxy connections (which cloud node 102), etc.

The JavaScript function contained in the PAC file defines the function:

```
function FindProxyForURL(url, host){
    // ...
}
ret = FindProxyForURL(url, host);
```

The above JavaScript function can be executed in order to determine the proxy server (if any) to use for that URL. Without a PAC file, each user device 300 can be configured with a single proxy server for all URLs, and optionally, with excluded URLs that may be accessed directly. There are various JavaScript functions defined for PAC files, including hostname based conditions, utility functions, URL/hostname based conditions, time-based conditions, etc. For example, these may include:

| Hostname based conditions |
| --- |
| isPlainHostName( ) |
| dnsDomainIs( ) |
| localHostOrDomainIs( ) |
| isResolvable( ) |
| isInNet( ) |
| URL/hostname based conditions |
| shExpMatch( ) |
| Related utility functions |
| dnsResolve( ) |
| myIpAddress( ) |
| dnsDomainLevels( ) |
| Time based conditions |
| weekdayRange( ) |
| dateRange( ) |
| timeRange( ) |

The PAC file is necessary to implement complex functions between the cloud system 100 and the user device 300.

As described herein, the implementation of the PAC file parser is such that all PAC functions do not need JIT to run PAC functions. The implementation is memory efficient.

Figure 5:
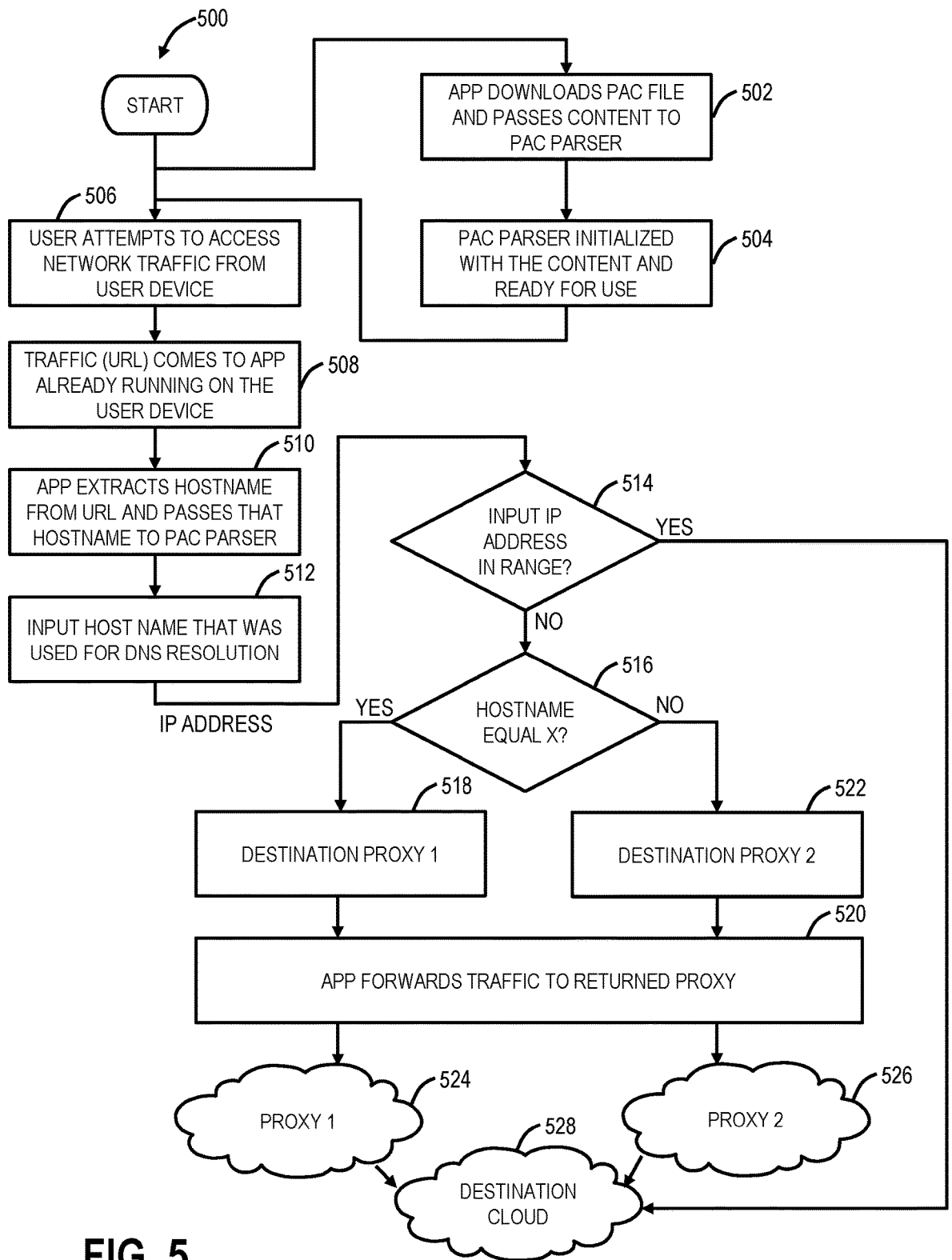
FIG. 5 is a flowchart of a PAC parsing process.

FIG. 5 is a flowchart of a PAC parsing process 500. The PAC parsing process 500 can be implemented in the user device 300 for use with a cloud service such as via the cloud-based system 100. The PAC parsing process 500 can be implemented as computer-readable code stored in a non-transitory computer-readable storage medium. The PAC parsing process 500 can also be implemented in conjunction with the enterprise application 400.

The PAC parsing process 500 includes the enterprise application 400 downloading a PAC file and passing the content to a PAC parser (step 502) and initializing the PAC parser with the content so that the PAC parser is ready to use (step 504).

The PAC parsing process 500 further includes, when a user attempts to access network traffic from the user device 300 (step 506), the network traffic (URL) coming to the enterprise application 400 that is already running on the user device 300 (step 508). The enterprise application 400 extracts the hostname from the URL and passes that hostname to the PAC parser (step 510). The input is the hostname used for the DNS resolution (step 512).

With the IP address, the PAC parsing process 500 includes checking the IP address range (step 514). If the IP address is in a certain range (step 514), the PAC parsing process 500 includes direct access, such as to a destination cloud (step 528). If the IP address is out of the range (step 514), the PAC parsing process 500 checks the hostname (step 516). Based on the hostname (step 516), the PAC parsing process 500 uses a first destination proxy (step 518) or a second destination proxy (step 520). The enterprise application 400 forwards the network traffic to the returned proxy (step 520), and the traffic goes to the destination (steps 524, 526, 528).

For example, the process can include obtaining a Proxy Auto Config (PAC) file from a cloud service and initializing a PAC parser on the user device therewith; for a request to access a Uniform Resource Locator (URL), extracting a hostname and providing the hostname to the PAC parser; and, based on an Internet Protocol (IP) address associated with the hostname, one of i) sending the request direct to the Internet separate from the cloud, ii) sending the request to a first proxy associated with the cloud service, and iii) sending the request to a second proxy associated with the cloud service.

The user device can include an operating system that does not support JIT operation. The PAC parser performs a plurality of PAC functions without a Just-In-Time (JIT) compiler. The present disclosure uses a native OS-based JS engine (such as, a native iOS JS engine) to call code from JS (e.g., objective C code). For example, when a JS function is called in the PAC parser, such as dnsresolve, myipaddress, etc., this function implementation is in a native language (Objective C in iOS) and this implementation is called through native OS-based JS engine and its output is returned back to the PAC parser. That is, the PAC parser exports all JS functions requiring JIT to this native implementation bridging with OS-based JS engine.

For example, in iOS, Apple's native JS engine allows a call to objective C code from Javascript. Thus, in an embodiment, dnsresolve and myipaddress (both PAC functions) are overridden in JS and performed in a native language (e.g., Objective C). When this function executes in a PAC file, a call is made in JS (instead of JIT) to the native language, and the output is returned back to the JS function.

In an embodiment, the approach allows the use of PAC files that include JIT functions without JIT support. That is, there is a call within JS to a native language and the output is returned. As such, PAC functions requiring JIT support are allowed in these scenarios.

The sending steps can be performed based on a prefix of the IP address. The sending steps to the first proxy and the second proxy can be performed based on the hostname. The cloud service can be a cloud-based security system, and the first proxy and the second proxy are based on rules of the cloud-based security system.

The following is an example PAC file:

```
Function FindProxyForURL(URL, host) {
    var privateIP = /^(0|10|127|192|168|172...);
    var resolved_IP = dnsResolve(host);
    /* Do not send non-FQDN or private IP auths */
    If(isPlainHostName(host) || privateIP.test(resolved_IP)
        Return "DIRECT";
    If(localHostOrDomainIs(host,"xxx.yyy"))
        Return Proxy 1;
    /* Default Traffic Forwarding */
        Return Proxy 2;
}
```

In the above example, PAC file, dnsResolve (host) extracts the IP address from the hostname. This is an example function that traditionally uses JIT, but can be called to a native language, as described above. Multi proxy is used to distinguish traffic and decide a destination proxy based thereon. For example, corporate IT policy may include all internal traffic goes to a first proxy whereas all public traffic goes to a second proxy. Of course, various embodiments are possible.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming a user device to perform steps of:
    obtaining a Proxy Auto Config (PAC) file from a cloud service and initializing a PAC parser on the user device therewith, wherein the user device includes an operating system that does not support a Just-In-Time (JIT) compiler;
    for a request to access a Uniform Resource Locator (URL), extracting a hostname and providing the hostname to the PAC parser; and
    based on an Internet Protocol (IP) address associated with the hostname, one of i) sending the request direct to the Internet separate from the cloud service, ii) sending the request to a first proxy associated with the cloud service, and iii) sending the request to a second proxy associated with the cloud service, wherein the request is sent direct to the cloud service in response to the IP address being within a predetermined range.

2. The non-transitory computer-readable storage medium of claim 1, wherein the PAC parser performs a plurality of PAC functions that require the JIT compiler via a call to code implemented in a native language.

3. The non-transitory computer-readable storage medium of claim 1, wherein the sending steps are performed based on a prefix of the IP address.

4. The non-transitory computer-readable storage medium of claim 1, wherein the sending steps to the first proxy and the second proxy are performed based on the hostname.

5. The non-transitory computer-readable storage medium of claim 1, wherein the cloud service is a cloud-based security system and the first proxy and the second proxy are based on rules of the cloud-based security system.

6. The non-transitory computer-readable storage medium of claim 5, wherein the first proxy is for private traffic and the second proxy is for public traffic.

7. A user device comprising:
    a network interface communicatively coupled to a network;
    a processor communicatively coupled to the network interface; and
    memory storing computer-executable instructions that, when executed, cause the processor to
        obtain a Proxy Auto Config (PAC) file from a cloud service and initializing a PAC parser on the user device therewith;
        for a request to access a Uniform Resource Locator (URL), extract a hostname and providing the hostname to the PAC parser; and
        based on an Internet Protocol (IP) address associated with the hostname, one of i) send the request direct to the Internet separate from the cloud service, ii) send the request to a first proxy associated with the cloud service, and iii) send the request to a second proxy associated with the cloud service, wherein the request is sent direct to the cloud service in response to the IP address being within a predetermined range,
        wherein the user device includes an operating system that does not support Just-In-Time (JIT) compiler.

8. The user device of claim 7, wherein the PAC parser performs a plurality of PAC functions that require the JIT compiler via a call to code implemented in a native language.

9. The user device of claim 7, wherein the sending steps are performed based on a prefix of the IP address.

10. The user device of claim 7, wherein the sending steps to the first proxy and the second proxy are performed based on the hostname.

11. The user device of claim 7, wherein the cloud service is a cloud-based security system and the first proxy and the second proxy are based on rules of the cloud-based security system.

12. The user device of claim 11, wherein the first proxy is for private traffic and the second proxy is for public traffic.

13. A method comprising:
    obtaining a Proxy Auto Config (PAC) file from a cloud service and initializing a PAC parser on the user device therewith, wherein the user device includes an operating system that does not support a Just-In-Time (JIT) compiler;
    for a request to access a Uniform Resource Locator (URL), extracting a hostname and providing the hostname to the PAC parser; and
    based on an Internet Protocol (IP) address associated with the hostname, one of i) sending the request direct to the Internet separate from the cloud service, ii) sending the request to a first proxy associated with the cloud service, and iii) sending the request to a second proxy associated with the cloud service, wherein the request is sent direct to the cloud service in response to the IP address being within a predetermined range.

14. The method of claim 13, wherein the PAC parser performs a plurality of PAC functions that require the JIT compiler via a call to code implemented in a native language.

15. The method of claim 13, wherein the sending steps are performed based on a prefix of the IP address.

16. The method of claim 13, wherein the sending steps to the first proxy and the second proxy are performed based on the hostname.

17. The method of claim 13, wherein the cloud service is a cloud-based security system and the first proxy and the second proxy are based on rules of the cloud-based security system.

* * * * *